United States Patent
Pesek et al.

(10) Patent No.: US 10,008,879 B2
(45) Date of Patent: Jun. 26, 2018

(54) SELF-DISCHARGING RESERVE POWER UNITS AND RELATED METHODS

(71) Applicant: Fisher Controls International LLC, Marshalltown, IA (US)

(72) Inventors: Thomas A. Pesek, Ankeny, IA (US); Ross Schade, Ames, IA (US); Chris Poulsen, Provo, UT (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 318 days.

(21) Appl. No.: 14/961,443

(22) Filed: Dec. 7, 2015

(65) Prior Publication Data

US 2016/0172903 A1  Jun. 16, 2016

Related U.S. Application Data (60) Provisional application No. 62/090,749, filed on Dec. 11, 2014.

(51) Int. Cl.
| | |
|---|---|
| *H02J 9/00* | (2006.01) |
| *H02J 9/06* | (2006.01) |
| *H02J 7/00* | (2006.01) |
| *H02J 7/34* | (2006.01) |

(52) U.S. Cl.
CPC ............ *H02J 9/061* (2013.01); *H02J 7/0047* (2013.01); *H02J 7/0077* (2013.01); *H02J 7/0013* (2013.01); *H02J 7/0014* (2013.01); *H02J 7/0068* (2013.01); *H02J 7/345* (2013.01)

(58) Field of Classification Search
CPC ...... H02J 7/0047; H02J 7/0077; H02J 7/0013; H02J 7/0014; H02J 7/0068; H02J 7/345; H02J 9/061

USPC ...................... 307/66, 64; 320/132, 166, 118
See application file for complete search history.

(56) References Cited

U.S. PATENT DOCUMENTS

| | | | |
|---|---|---|---|
| 2007/0046263 A1 | 3/2007 | Matsushima et al. | |
| 2012/0248876 A1* | 10/2012 | Tamura | G01R 31/3679 307/66 |
| 2013/0307480 A1* | 11/2013 | Boggs | B60L 3/00 320/118 |
| 2014/0288781 A1* | 9/2014 | Horiguchi | B60R 21/01 701/45 |

OTHER PUBLICATIONS

International Searching Authority, "International Search Report," issued in connection with International Patent Application No. PCT/US2015/065173, dated Mar. 7, 2016, 3 pages.
International Searching Authority, "Written Opinion," issued in connection with International Patent Application No. PCT/US2015/065173, dated Mar. 7, 2016, 6 pages.

* cited by examiner

*Primary Examiner* — Thomas Skibinski
(74) *Attorney, Agent, or Firm* — Hanley, Flight & Zimmerman, LLC (57) ABSTRACT

Self-discharging reserve power units and related methods are described. A self-discharging reserve power unit comprises an electrical energy storage component to provide power to a process control device. The electric energy storage component is coupled to an energy discharge component and a controller, which causes the discharge component to discharge energy from the electrical energy storage component following completion of an operation by the process control device.

20 Claims, 9 Drawing Sheets

SELF-DISCHARGING RESERVE POWER UNITS AND RELATED METHODS

This patent claims the benefit of the filing date of U.S. Provisional Application Ser. No. 62/090,749, which was filed on Dec. 11, 2014 and is hereby incorporated herein by reference in its entirety.

FIELD OF THE DISCLOSURE

This disclosure relates generally to reserve power units and, more particularly, to self-discharging reserve power units.

BACKGROUND

Reserve power units (RPUs) are used to provide backup power in the event of power loss and are typically implemented using generators and/or electrical energy storage devices. The energy storage devices generally include batteries or capacitors, and are often used to provide power to perform safety functions or operations within a process control system, such as moving a valve or other process control component to a safe shutdown position (e.g., a failsafe position). Many energy storage devices are either rechargeable and/or easily replaceable.

The function(s) or operation(s) performed using the power from the energy storage device may not require all the energy in the energy storage device. In some applications, the presence of remaining energy in the energy storage device of an RPU is problematic. Many RPUs currently in use do not control or fully discharge remaining energy in the energy storage device and, thus, are not suitable for use in certain applications or environments.

SUMMARY

An example apparatus comprises an electrical energy storage component or device to supply power to a process control device, a discharge component operatively coupled to the electrical energy storage device, and a controller to, in response to a loss of power, cause the discharge component to discharge energy from the electrical energy storage component following completion of an operation by the process control device.

An example method comprises detecting a loss of power to a process control device, providing the process control device with power from an electrical energy storage component, interrupting a control signal to the process control device in response to the loss of power, and discharging remaining energy in the electrical energy storage component following completion of an operation by the process control device.

Another example method comprises supplying energy to a process control device via an electrical energy storage device and discharging remaining energy from the electrical energy storage device after the process control device completes an operation

BRIEF DESCRIPTION OF THE DRAWINGS

FIGS. 2-1 through 3-3 are schematic diagrams illustrating one way of implementing the example apparatus of FIG. 1.

DETAILED DESCRIPTION

The example apparatus described herein involves a reserve power unit (RPU) located between a process control device (e.g., an actuator and valve assembly) and an electrical power source. The power source provides electrical power to the process control device when the process control system is operating normally. The example RPU is also positioned between the process control device and a signal(s) to the process control device from a control system. In response to a power loss, either intentional or unintentional, the RPU disrupts or interrupts the control signal(s) and provides power to the process control device via an energy storage device(s) or component(s) (e.g., capacitors, batteries, etc.) disposed within the RPU. The interruption of the control signal(s) may cause the process control device to move toward a predetermined or failsafe position (e.g., fully open or fully close a valve). The energy storage device of the example apparatus is sized to enable the RPU to provide power to the process control device for a time period at least long enough for the process control device to move to the failsafe position. The example RPU then discharges any remaining energy in the energy storage device to facilitate safe maintenance of the process control device and/or the RPU.

In some examples, the discharge of energy from the energy storage device requires a predetermined maximum amount of time to complete. However, the actual completion time may vary depending on the position of the process control device at the time of a power loss. In some examples, the apparatus may be disposed in an explosion proof housing and/or operating in a potentially hazardous environment. Waiting the predetermined maximum amount of time before opening the explosion proof housing to perform maintenance assures service personnel that any energy in the energy storage device of the RPU has been substantially fully discharged and eliminates risk that a spark may be generated while servicing the process control device and/or RPU. In other examples, the RPU may receive a feedback signal (e.g., digital output, analog output, digital communications signal) from the process control device when the process control device has completed the move to the failsafe position. Upon receiving such a signal, the RPU may begin discharging.

The discharge operation of the example apparatus described herein controls power dissipation of one or more solid state switches with a pulse-width modulated (PWM) signal. The example RPU is configured so that the discharge of energy does not exceed a predetermined rate to prevent a maximum operating temperature of the switches from being exceeded. A duty cycle of the PWM signal affects the time required to complete the discharge of the energy storage device and also ensures that the discharge rate will not overheat the components of the RPU. An appropriate duty cycle is determined by certain factors including the voltage remaining in the energy storage device and characteristics of a heat sink (e.g., thermal resistance, size, etc.) that is to facilitate the dissipation of energy.

Figure 1:
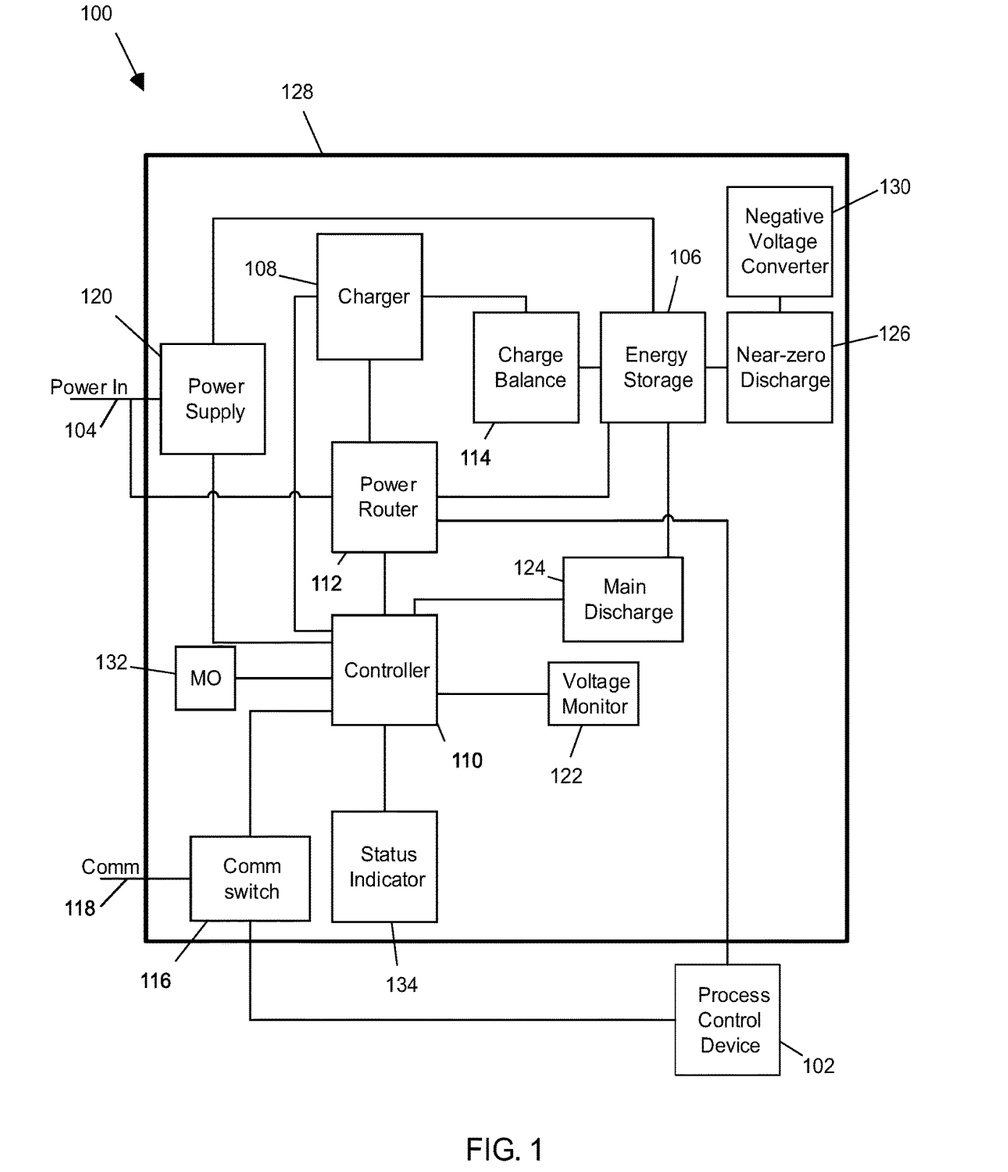
FIG. 1 is a schematic block diagram of an example apparatus in accordance with the teachings herein.

FIG. 1 is a schematic block diagram of an example apparatus 100 in accordance with the teachings herein. The example apparatus 100 is depicted as an RPU 100 that provides reserve electrical power to a process control device 102 in the event of a loss of power from a primary power source 104. The RPU 100 provides power to the process control device 102 via an electrical energy storage device 106. The energy storage device 106 may be implemented using one or more components such as, for example, capacitors, batteries, etc., or a combination thereof. Additionally, the energy storage device 106 is designed to store sufficient electrical energy to provide power to the process control device 102 for at least an amount of time to allow the process control device 102 to complete an operation following a disruption or loss of power from the primary power source 104. For example, the process control device 102 may be a fluid valve and actuator assembly and the RPU 100 may provide power to the actuator for an amount of time sufficient for the actuator to move the fluid valve to a failsafe position, regardless of the initial position of the fluid valve.

During normal operation, when the primary power source 104 is providing energy to the process control device 102, a charger 108 disposed within the RPU 100 is charging and/or maintaining the charge of the energy storage device 106 to a substantially fully charged condition. The charger 108 may be implemented using circuitry tailored to most effectively and efficiently charge the energy storage device 106. For example, the charger 108 may function as a variable current source if the energy storage device 106 is implemented using multiple, series-connected large value capacitors, commonly known as super-capacitors. In that case, the charger 108 may provide current that may be varied by a controller 110 so that the charging current is decreased as the energy storage device 106 approaches the fully charged condition. In this manner, the temperature of the energy storage device 106 may be controlled and/or the possibility of overcharging the energy storage device 106 is substantially eliminated.

As depicted in FIG. 1, the charger 108 receives electrical power from the primary power source 104 via a power router 112 that is controlled by the controller 110 as described in greater detail below. If the energy storage device 106 contains multiple components or devices, a charge balance circuit 114 may also be interposed between the charger 108 and the energy storage device 106 to ensure that each of the components of the energy storage device 106 is substantially equally charged. For example, if the energy storage device 106 contains multiple capacitors, the charge balance circuit 114 ensures that each of the capacitors is charged to substantially the same voltage.

During normal operation, the controller 110 causes the power router 112 to route the power provided by the primary power source 104 to the charger 108 and the process control device 102. Additionally, the controller 110 causes a communication switch 116 to communicatively couple one or more communication lines 118 to the process control device 102. The communication lines 118 may convey commands, messages, data, etc. between a control system and the process control device 102. Thus, during normal operation, the RPU 100 functions transparently (i.e., acts as a pass-through device) with the respect to the power and communication signals associated with the process control device 102.

As shown in FIG. 1, the example RPU 100 includes an internal power supply 120 that provides power to the controller 110 and numerous other circuits, devices, etc. making up the functional blocks of the example RPU 100. A more detailed description of the manner in which the power provided by the power supply 120 is distributed within the RPU 100 is provided below in connection with the description of the detailed schematics depicted in FIGS. 2 and 3. During normal operation, the power supply 120 derives the power it provides to the devices of the RPU 100 from the primary power source 104. Typically, but not necessarily, during normal operation, the power supply 120 steps down (e.g., using a buck converter, a linear regulator, etc.) the voltage of the primary power source 104 to a lower voltage or multiple, different lower voltages for use by the various circuits within the RPU 100.

As is also shown in FIG. 1, the controller 110 is operatively coupled to a voltage monitor 122 to monitor one or more voltages associated with the example RPU 100. For example, the voltage monitor 122 may provide signals corresponding to a voltage of the primary power source 104, a power supply voltage provided to the process control device 102, a voltage of the energy storage device 106 and/or any other voltages that may be used to control or affect the operation of the RPU 100.

In the event of a power loss at the primary power source 104, the power supply 120 continues to receive electrical energy from the energy storage device 106. In this manner, as described in more detail below, the power supply 120 can continue to supply power to the circuitry within the RPU 100 for a period of time sufficient to enable the process control device 102 to complete an operation such as, for example, moving to a shutdown or failsafe position (e.g., a fully open or fully closed position). In response to detecting a power failure at the primary power source 104 via the voltage monitor 122, the controller 110 causes the power router 112 to enable (e.g., close) a connection between the energy storage device 106 and the process control device 102. Thus, in response to the detected power failure, the power router 112 routes the power from the energy storage device 106 to the process control device 102 to allow continued operation of the process control device 102. Additionally, in response to the detected power failure, the controller 110 causes the power router 112 to disable (e.g., open) a connection between the primary power source 104 and the charger 108, thereby disabling the charger 108 and preventing further charging of the energy storage device 106 and prevent back-feeding of the primary power source via the charge balance circuitry 114. Still further, in response to the detected power failure, the controller 110 causes the communications switch 116 to open to prevent the signals on the communications lines 118 from reaching the process control device 102. The loss of the signals on the communications lines 118, in turn, causes the process control device 102 to enter a power failure mode and to begin moving toward a predetermined (e.g., failsafe) position.

In response to the detection of the power failure at the primary power source 104, the controller 110 also performs a controlled discharge of the energy storage device 106 via a main discharge circuit 124 and a near-zero discharge circuit 126. The controlled discharge of the energy storage device 106 may begin after a predetermined amount of time following the detection of the power failure, be initiated by the process control device 102, or may begin immediately following the detection of the power failure, depending on the needs of a particular application. The controlled discharge is initiated and supervised by the controller 110 to enable the process control device 102 to complete an operation such as, for example, the movement to a failsafe position before the remaining energy in the energy storage device 106 falls below a threshold amount that prevents further movement of the process control device 102.

To control the main discharge circuit 124, the controller 110 may provide a pulse-width modulated (PWM) signal to control one or more power switches that periodically shunt the energy storage device 106 to a ground potential, thereby dissipating the energy stored in the energy storage device 106. The duty cycle of the PWM signal may be varied in accordance with a voltage of the energy storage device 106 measured via the voltage monitor 122 to control a maximum power dissipation and, thus, temperature of the main discharge circuit 124. For example, the duty cycle of the PWM signal may be increased as the voltage of the energy storage device 106 decreases. To facilitate the removal of heat from the main discharge circuit 124, various components of the main discharge circuit 124 may be thermally coupled to a housing 128 of the RPU 100. The housing 128 may be composed of metal(s) and/or any other material. Thus, the housing 128, in addition to forming a protective covering for the circuitry of the RPU 100, may also function as a heat sink for some or all of the main discharge circuitry 124 and any other circuitry in the RPU 100.

When the main discharge circuit 124 is functioning, a negative voltage converter 130 provides a negative voltage to the near-zero discharge circuit 126 to disable the near-zero discharge circuit 126, thereby preventing the near-zero discharge circuit 126 from shunting energy stored in the energy storage device 106 to a ground potential. As the main discharge circuit 124 dissipates the energy stored in the energy storage device 106, the voltage provided to the power supply 120 by the energy stored in the energy storage device 106 continues to decrease. While the voltage provided to the power supply 120 by the energy storage device 106 exceeds the voltage needed by the controller 110 for proper operation of the controller 110, the power supply 120 uses a buck regulator to provide power to the controller 110. However, when the voltage of the energy storage device 106 is no longer sufficient to enable the power supply 120 to use the buck regulator to provide power to the controller 110, a boost circuit within the power supply 120 becomes active and continues to supply power to the controller 110 as the voltage at the energy storage device 106 continues to decrease. In this manner, the dual operating modes (i.e., buck/boost) of the power supply 120 enable the controller 110 to continue controlling the discharge of the remaining energy in the energy storage device 106 via the main discharge circuit 124. In one example, the power supply 120 may continue to operate and provide sufficient power to the controller 110 for a voltage as low as, for example, 150 millivolts at the energy storage device 106.

Figure 33:
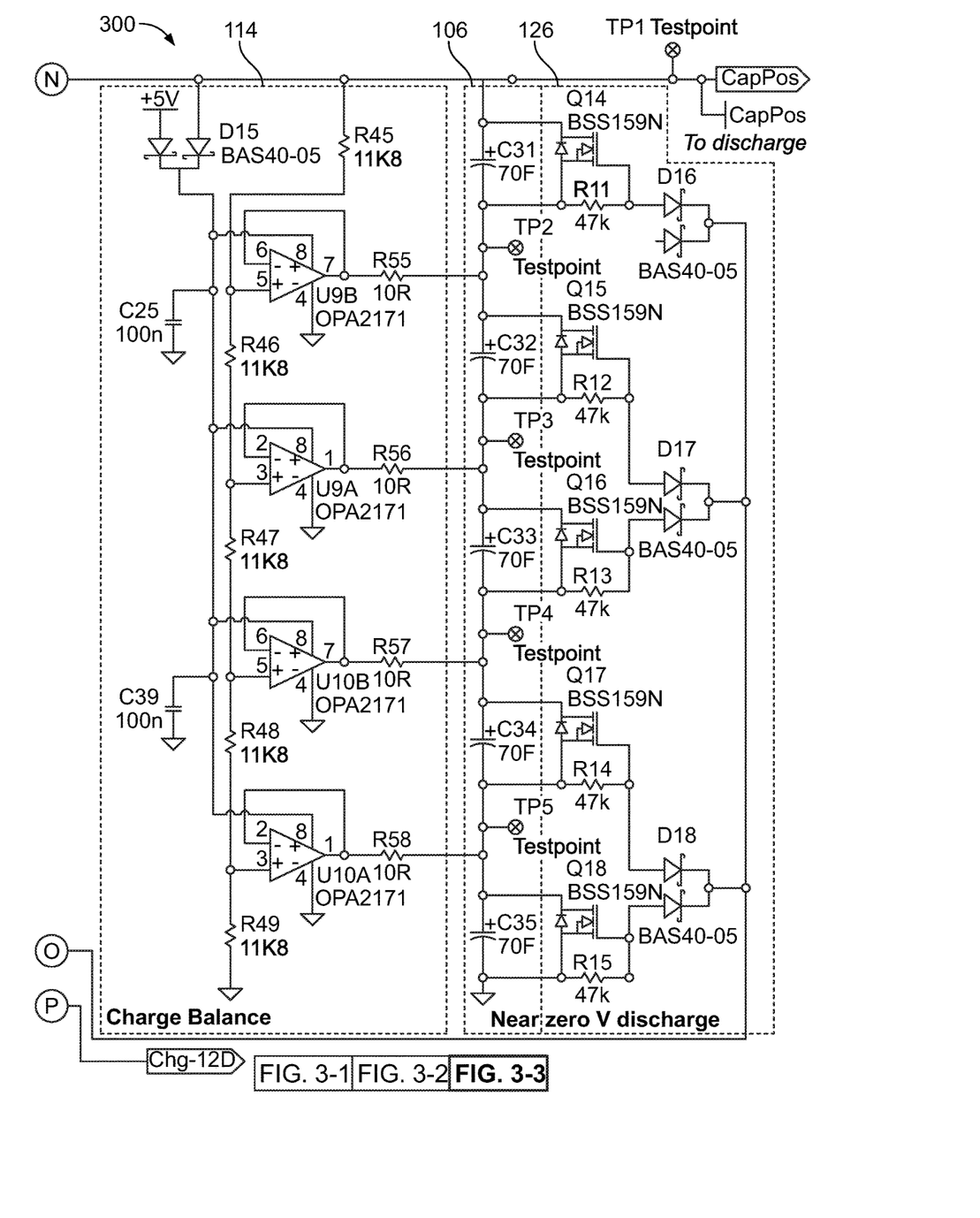

When the voltage of the energy storage device 106 falls below a low threshold at which the power supply 120 can no longer operate in a boost mode to provide sufficient power to the controller 110, the controller 110 becomes inoperative, which disables the main discharge circuit 124 and prevents the main discharge circuit 124 from dissipating any remaining energy in the energy storage device 106. Also, when the power supply 120 becomes inoperative, the negative voltage converter 130 no longer provides a negative disabling voltage to the near-zero discharge circuit 126, which enables the near-zero discharge circuit 126 to shunt the remaining energy in the energy storage device 106 to a ground potential. As shown in more detail in FIG. 3-3, the near-zero discharge circuit 126 includes one or more normally closed switches that function to shunt the energy storage device 106 to a ground potential in the absence of power being provided to the near-zero discharge circuit 126 via the negative voltage converter 130.

Other examples may use other methods to discharge the remaining energy. A particular example may not require the use of a boost circuit to maintain a minimum voltage requirement of the controller. Instead, an example apparatus may discharge any power remaining at this point through the use of one or more resistors. In this method, the controller would be operative to prevent the discharge as opposed to causing the discharge. Additionally, the resistor(s) and heat sink may need to be re-sized appropriately.

Thus, in response to a power failure at the primary power source 104, the example RPU 100 enables the process control device 102 to complete, for example, movement to a failsafe position and then performs a controlled discharge of the energy storage device 106 after a maximum predetermined amount of time has elapsed. As such, service personnel, for example, can be assured that after waiting the maximum predetermined amount of time following a failure or removal of the primary power source 104, an explosion proof container surrounding the RPU 100 and/or process control device 102 can be opened and the internal components of the RPU 100 or the process control device 102 can be serviced without risk of generating a spark or any other potentially harmful electrical event.

As shown in FIG. 1, the example RPU 100 also includes a manual override circuit 132. The manual override circuit 132 may include a switch external to the housing 128 that enables a person to select an RPU override mode. When the RPU override mode is selected or enabled, the RPU 100 functionality described above is bypassed and the process control device 102 operates as if it is directly coupled to the primary power source 104 and the communication lines 118. As a result, if the primary power source 104 fails or is otherwise removed, the process control device 102 does not receive any power from the energy storage device 106 and the process control device 102 may remain in the position it was in at the time of the power failure (i.e., may not be in a failsafe position).

The example RPU 100 also includes a status indicator 134, which may be mounted external to the housing 128 to facilitate viewing by a person. In this example, the status indicator 134 is a light controlled by the controller 110 to provide different blink patterns to indicate the operational status or mode of the RPU 100 and/or the energy storage device 106. Other examples may have a different status indicator 134 such as multiple light emitting diodes, a digital display, etc. The status indicator 134 of this example provides a different blink pattern for each of the modes of the RPU 100 including charging, discharging (i.e., when the energy storage device 106 is providing power to the process control device 102), normal, override and discharged. For example, the status indicator 134 may blink in a slow steady manner to indicate the RPU 100 is charging, the status indicator 134 may periodically blink twice rapidly followed by a pause to indicate discharge operation, the status indicator 134 may periodically blink once rapidly followed by a pause to indicate normal operation (i.e., the process control device 102 is receiving power from the primary power source 104 via the RPU 100), the status indicator 134 may provide a steady continuous light to indicate that the RPU 100 is in manual override mode, and the status indicator 134 may remain unlit to indicate that the RPU 100 is completely discharged.

The example controller 110 of FIG. 1 may be implemented by hardware, software, firmware and/or any combination of hardware, software and/or firmware. Thus, for example, the example controller 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or method claims of this patent to cover a purely software and/or firmware implementation, the example controller 110 is hereby expressly defined to include a tangible computer readable storage device or storage disk such as a memory, a digital versatile disk (DVD), a compact disk (CD), a Blu-ray disk, etc. storing the software and/or firmware. Further still, the example controller 110 of FIG. 1 may include one or more elements, processes and/or devices and/or may include more than one of any or all of the elements, processes and devices.

Additionally, the example controller 110 of FIG. 1 may communicate with one or more of the functional components (e.g., the voltage monitor 122, the main discharge circuit 124, the power router 112, etc.) using any type of wired connection (e.g., a databus, a USB connection, etc.) or a wireless communication mechanism (e.g., radio frequency, infrared, etc.) using any past, present or future communication protocol (e.g., Bluetooth, USB 2.0, USB 3.0, etc.). Further, one or more functional components of FIG. 1 may communicate with each other using such wired connections or wireless communication mechanisms.

Turning to FIGS. 2-1, 2-2, 2-3, 2-4, 3-1, 3-2 and 3-3, more detailed schematic diagrams illustrating one manner in which the circuitry of the example RPU 100 of FIG. 1 may be implemented are provided. The communication switch 116 is implemented in the example of FIG. 2-1 using opto-isolators U1 and U2 coupled to a transistor Q3, which is controlled via the processor U5. Similarly, the power router 112, shown in FIG. 2-2 may be implemented using opto-isolators U13 and U14 coupled to field-effect transistors (FETs) Q8, Q9, Q11, Q20 and Q21. The opto-isolators U13 and U14 may be controlled by transistors Q4 and Q5, which are coupled to a control signal provided by a processor U5, shown in FIG. 2-4. The programmable processor U5 may be used to implement the controller 110.

Figure 23:
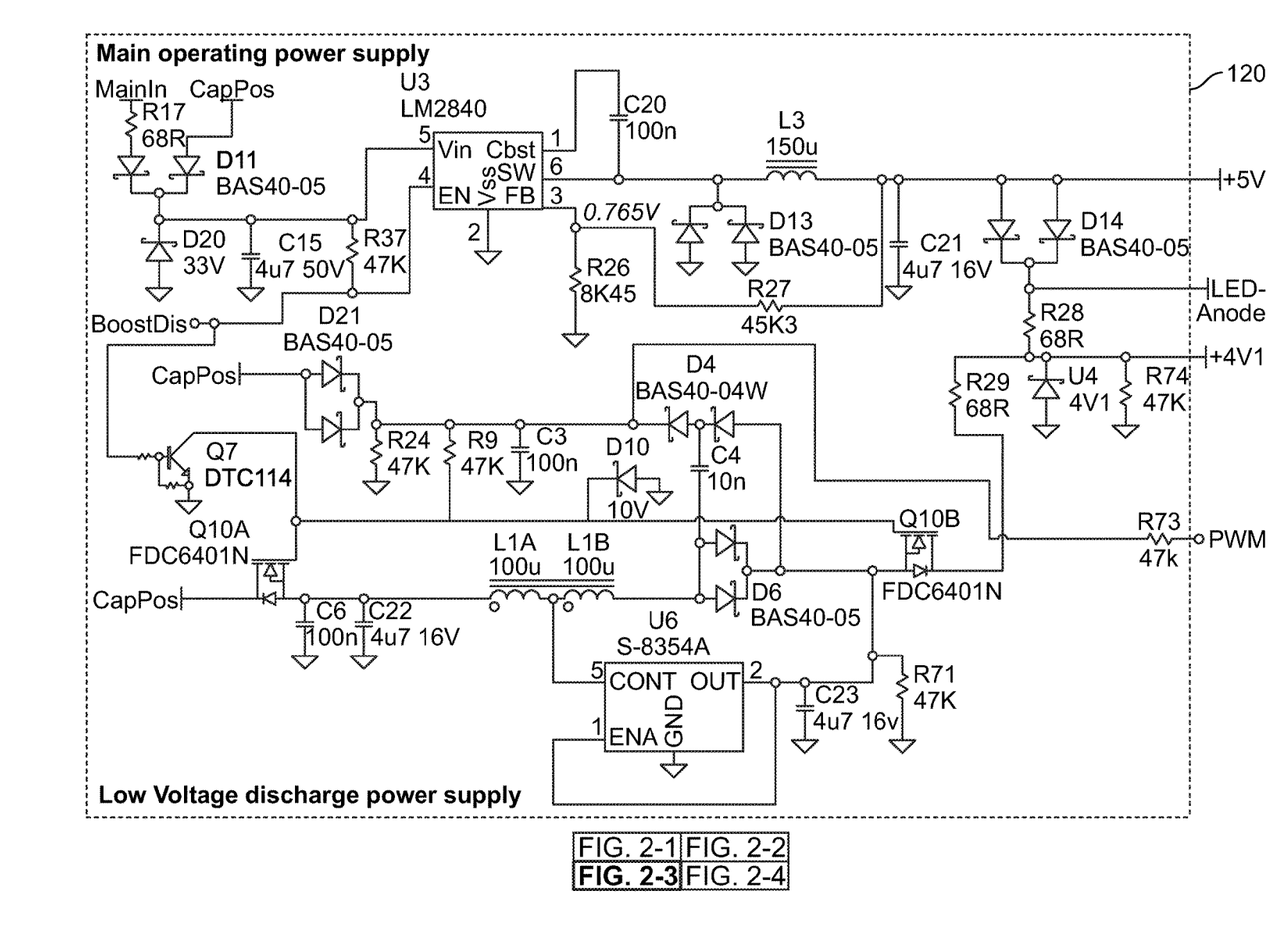

As shown in FIG. 2-3, the power supply 120 may be implemented using a buck converter that is controlled via a controller U3. The power supply 120 also includes a boost converter that is controlled via a separate controller U6. The outputs of the buck and boost converters are joined via a diode D14 and a resistor R28 to provide a sufficient operating voltage for the processor U5. During the controlled discharge, the voltage of the energy storage device 106 may range from a voltage greater than the voltage needed by the processor U5 to a voltage that is substantially lower than the voltage needed by the processor U5 for proper operation.

Block 300 of FIG. 2-1 is depicted in FIGS. 3-1-3-3 as a more detailed schematic diagram of circuitry that may be used to implement the charger 108, the charge balance circuit 114, the energy storage device 106, the near-zero discharge circuit 126 and the main discharge circuit 124. As shown in FIG. 3-1, the charger 108 may include a buck converter controller U7 that receives feedback from a current monitor U8 such that the charger 108 functions as a current source to charge the energy storage device 106. The charging current provided by the charger 108 is controllably varied by changing the reference voltage at the inverting terminal of an operational amplifier U11A, shown in FIG. 3-2. This reference voltage is varied in accordance with a varying voltage provided by the processor U5 (FIG. 2-4) via a digital-to-analog converter (DAC) signal that is provided to a buffer implemented with an operational amplifier U11B, shown in FIG. 3-1. The charging current provided to the energy storage device 106, shown in FIG. 3-3, may be decreased as the voltage of the energy storage device 106 approaches a fully charged condition to prevent overheating and/or overcharging of the energy storage device 106.

Figure 32:
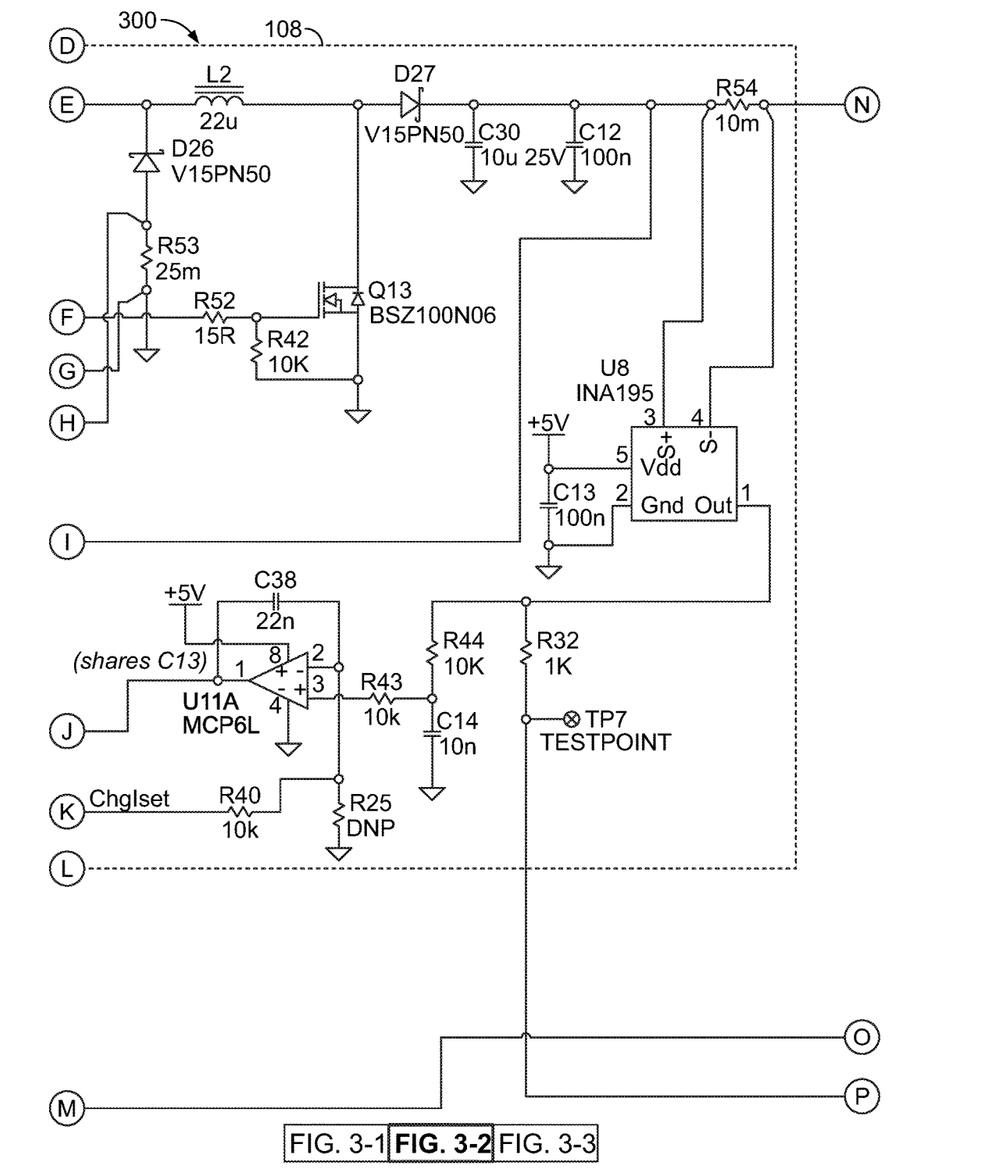

The charge balance circuit 114 may be implemented using a resistor divider including equal value resistors R45, R46, R47, R48, and R49. These resistors R45-R49 provide equal portions of the total voltage of the energy storage device 106 to respective individual capacitors C31, C32, C33, C34 and C35 making up the energy storage device 106 via respective buffers formed with the operational amplifiers U9A, U9B, U10A and U10B.

Figure 31:
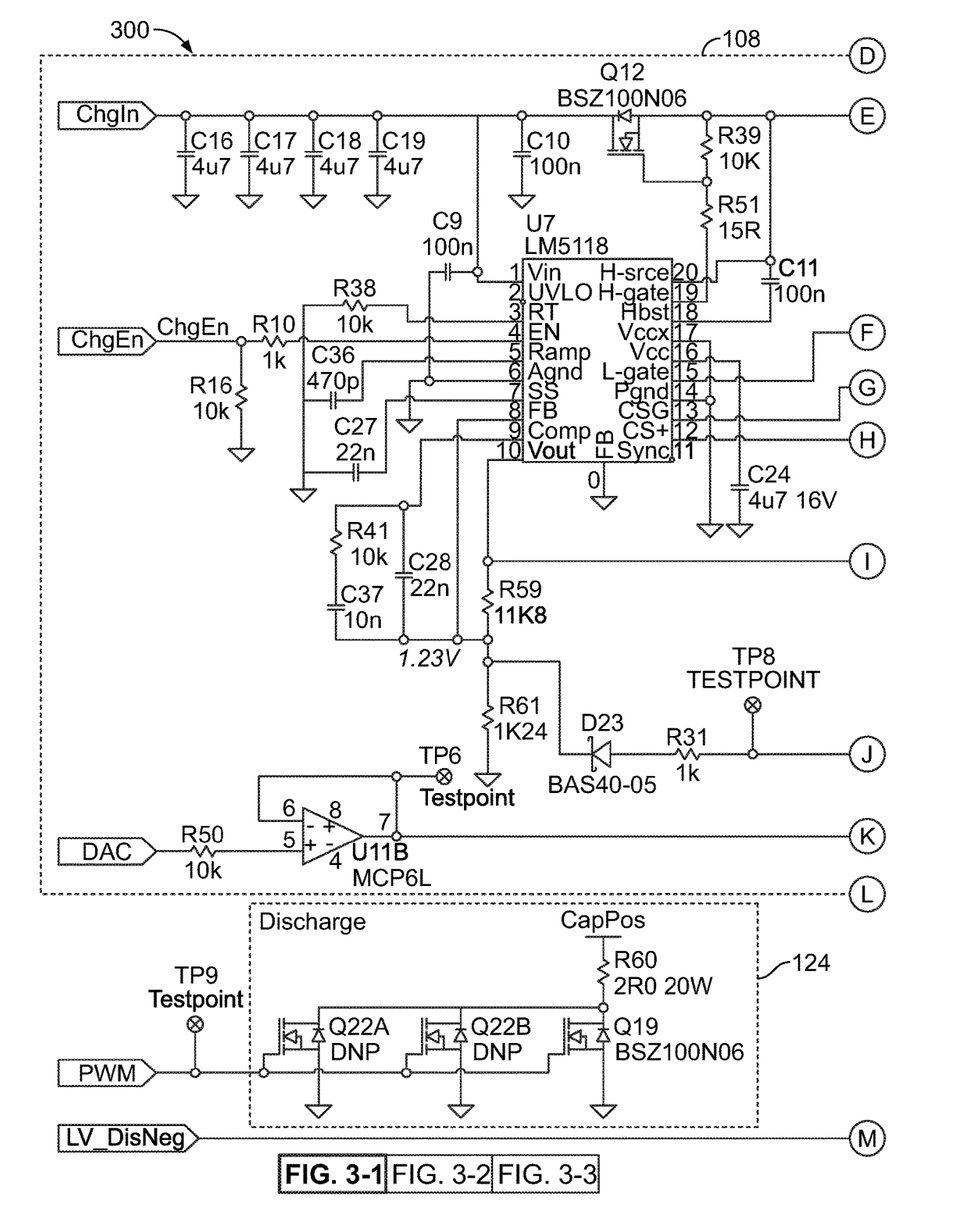

FIG. 3-1 shows the main discharge circuit 124 includes three FETs Q19, Q22A and Q22B and the voltage provided by the energy storage device 106 (labeled CapPos). The gate terminals of the FETs Q19, Q22A and Q22B are connected to the PWM signal provided by the processor U5. Thus, during operation of the main discharge circuit 124, the PWM signal causes the FETs Q19, Q22A and Q22B to periodically turn on and off to shunt the energy stored in the energy storage device 106 though the resistor R60 and the transistors Q19, Q22A and Q22B to a ground potential. Although three FETs are shown as implementing the main discharge circuit 124, fewer or more FETs and/or any other types of transistors or switches may be used instead to achieve the same or similar results.

Figure 24:
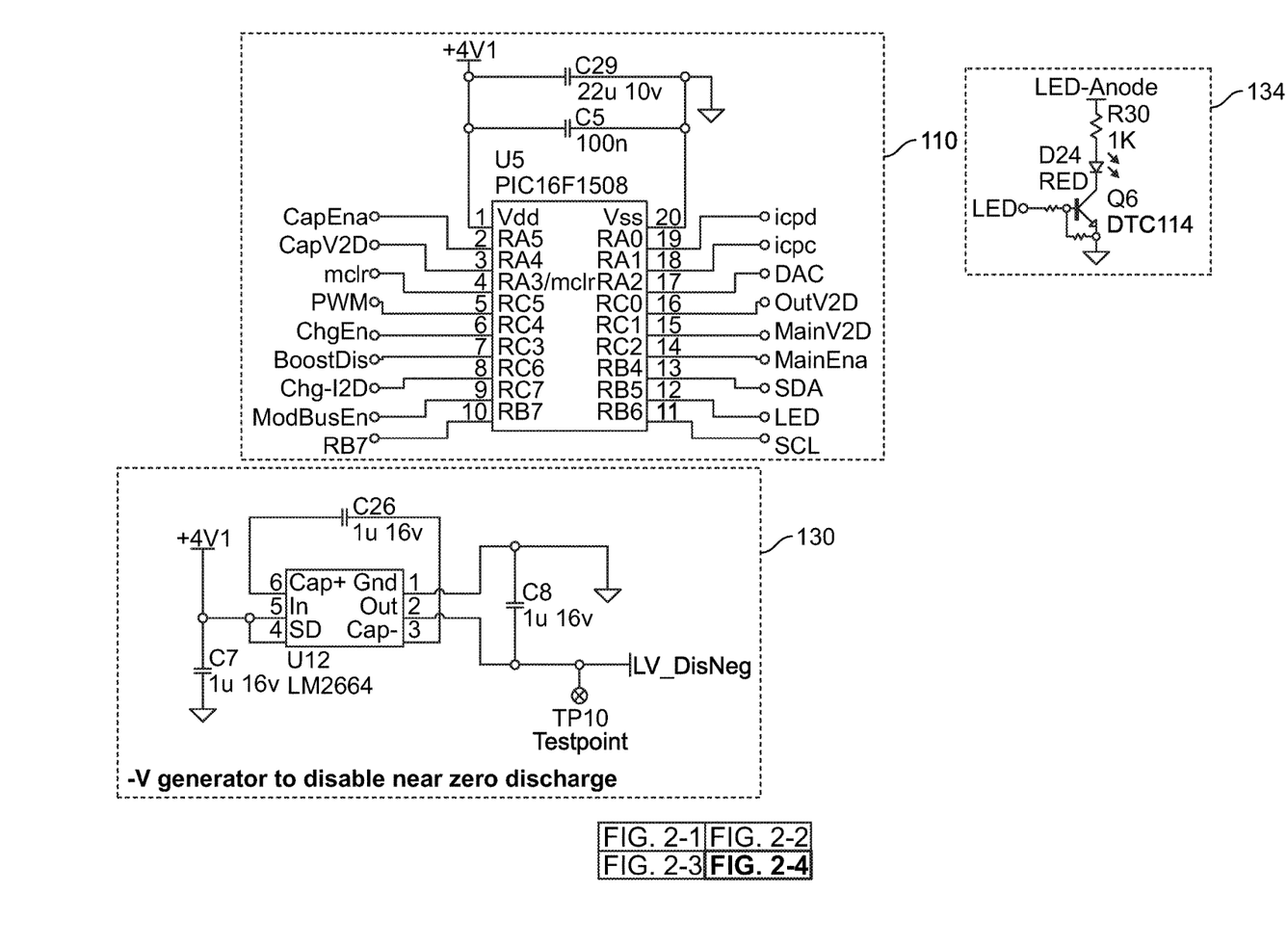

The near zero-discharge circuit 126, shown in FIG. 3-3 may be implemented using FETs Q14, Q15, Q16, Q17 and Q18, which are connected to shunt across respective ones of the capacitors C31, C32, C33, C34 and C35 to a ground potential. The FETs Q14-Q18 function as normally closed switches that, when energized, open (i.e., do not conduct) in response to the presence of the negative voltage provided by the negative voltage converter 130 (FIG. 2-4). However, as described above, when the primary power source 104 fails or is otherwise not available, the power supply 120 continues to operate by drawing energy from the energy storage device 106 for a certain amount of time. However, when the voltage of the energy storage device 106 falls below a threshold, the power supply 120 no longer functions, which causes the negative voltage converter 130 to no longer provide the negative voltage to the near zero-discharge circuit 126, shown in FIG. 3-3. The loss of the negative voltage causes the FETs Q14-18 of the near zero-discharge circuit 126 to revert to their normally closed (i.e., conducting) states, thereby shunting any remaining energy in the capacitors C31-C35 to ground potential and, thus, dissipating the remaining energy in the process.

Figure 4:
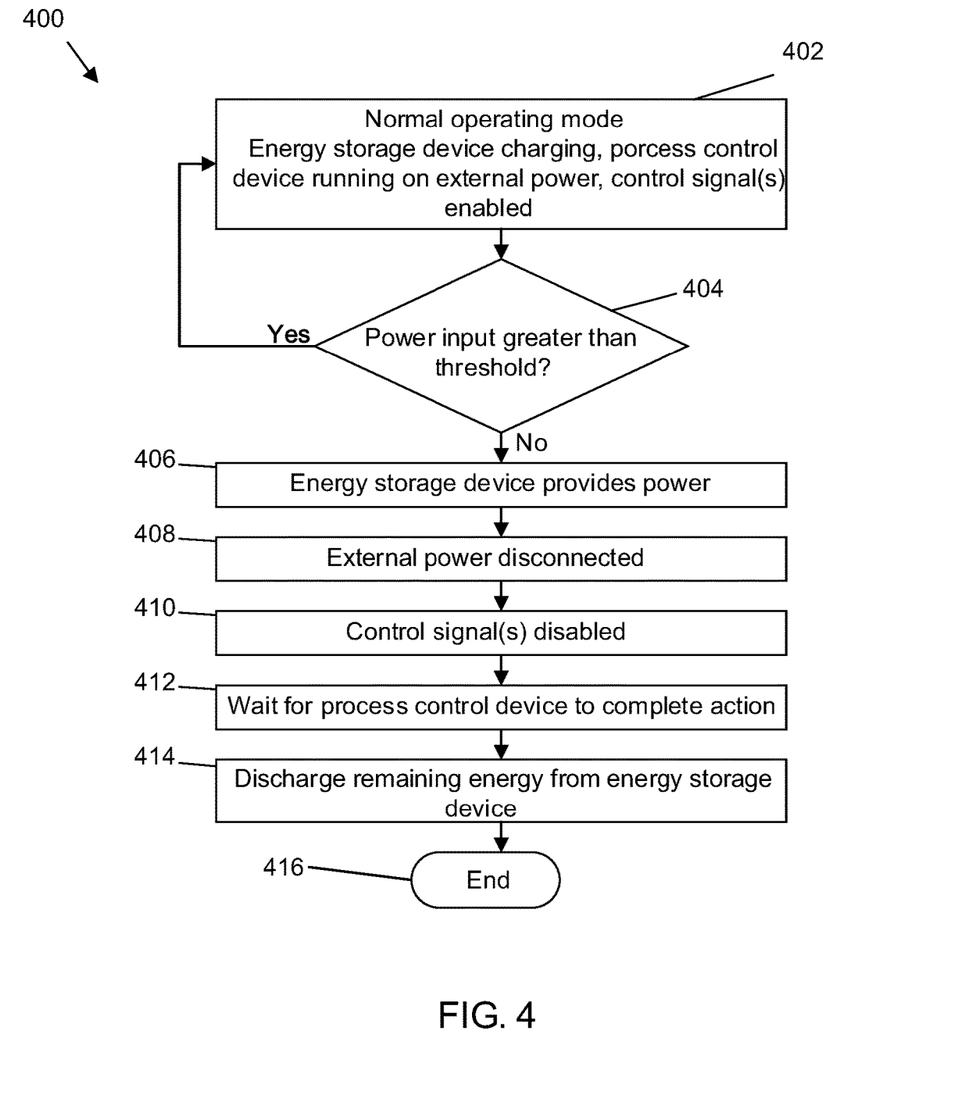
FIG. 4 is a flowchart depicting an example method that may be implemented with the example apparatus of FIG. 1.
Figure 21:
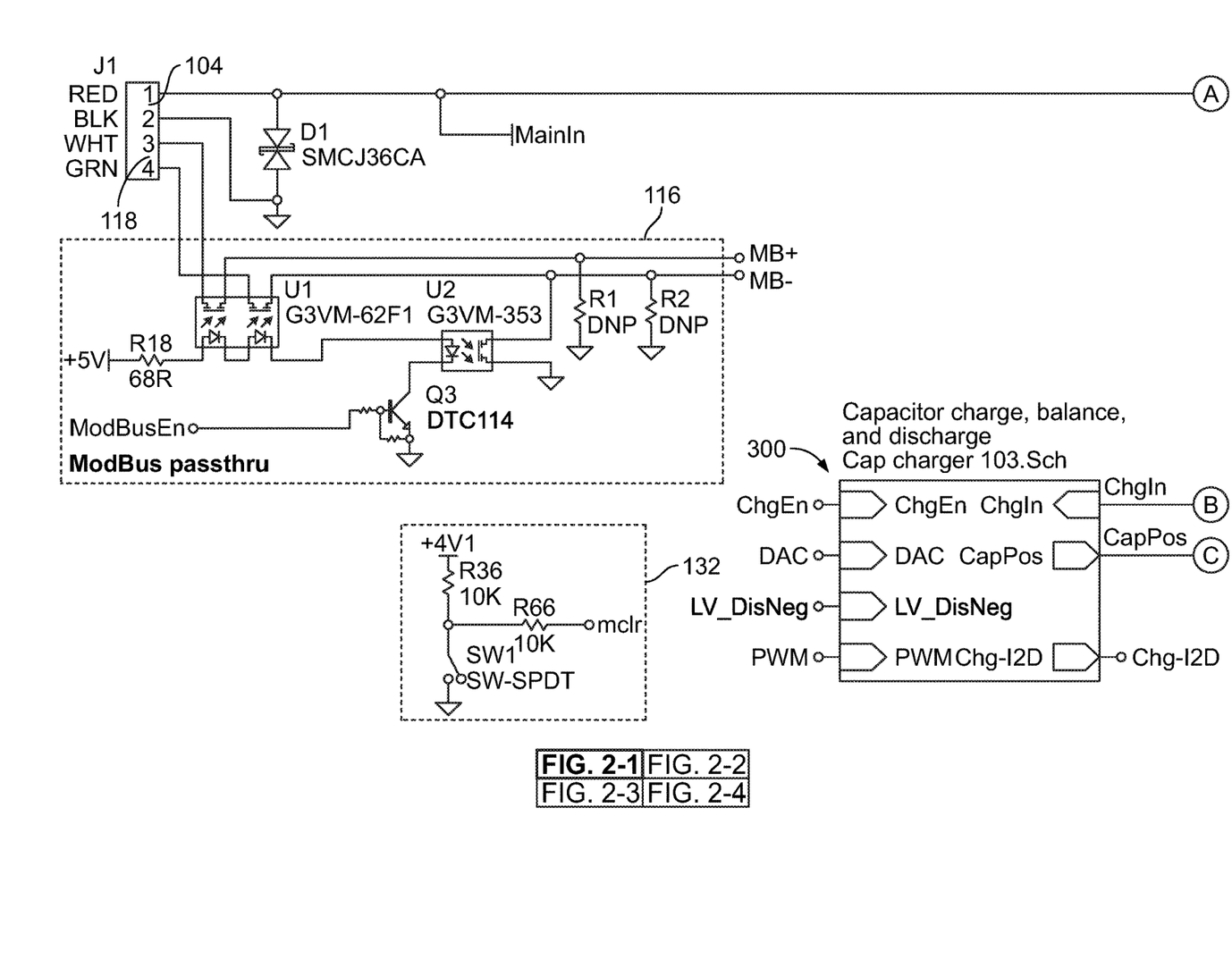
Figure 22:
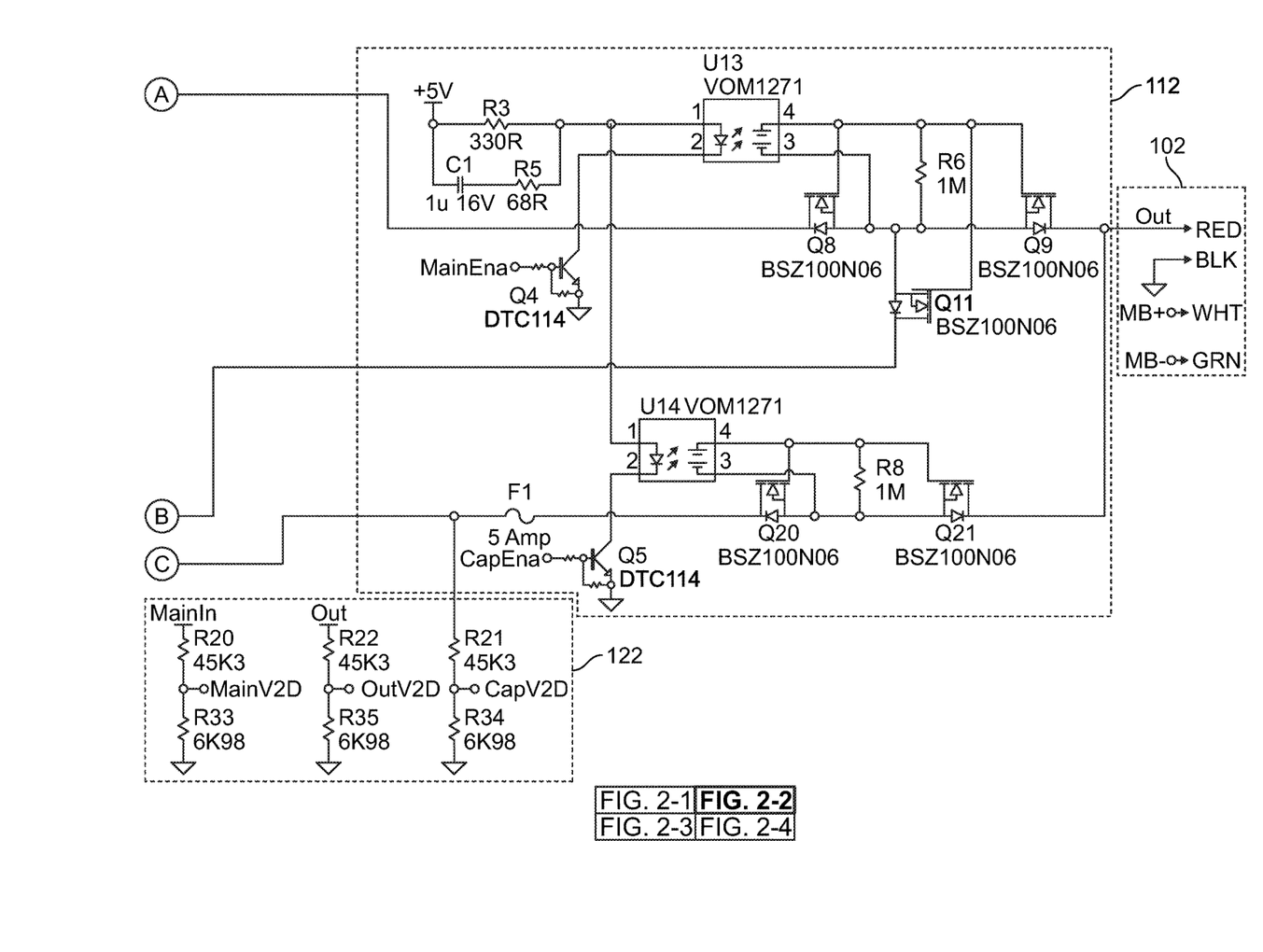

FIG. 4 depicts an example method 400 implemented by the example apparatus 100. Block 402 represents the process control device 102 in a normal operating mode, in which the energy storage device 106 is charging, the process control device 102 is operating on external power (i.e., the primary power source 104) and the control signal(s) from the communication lines 118 are enabled (i.e., connected to the process control device 102). The voltage monitor 122 monitors the voltage of the primary power source 104 provided to the RPU 100 and compares this voltage to a threshold (block 404). If the voltage is above the threshold, the example apparatus 100 and process control device 102 continue operating normally (i.e., control returns to block 402). If the voltage of the primary power source 104 falls below the threshold, it is indicative that the primary power source 104 has failed, at which time the power router 124 causes the process control device 102 to operate on power provided by the energy storage device 106 (block 406). The controller 110 then disables a connection between the primary power source 104 and the charger 108 (block 408). Additionally, the controller 110 disables a connection between the communication lines 118 and the process control device 102 via the communications switch 116 (block 410), thereby activating a loss of signal function in the process control device 102 and causing the process control device 102 to move to a failsafe position. The controller 110 waits for the process control device 102 to complete the movement, which may include, for example, waiting a predetermined amount of time sufficient for the process control device 102 to complete the movement or receiving a notification that the movement has completed (block 412). The controller 110 then begins discharging remaining energy from the energy storage device 106 (block 414). In the example method 400, discharging the remaining energy from the energy storage component 106 may include one or more steps (e.g., discharging via the main discharge circuit 124, discharging via the near-zero discharge circuit 126). After the remaining energy in the energy storage device 106 is discharged, the controller 110 is no longer operative because it is not receiving power from the power supply 120 and the RPU 100 is fully discharged (block 416).

In this example, at least a portion of the method represented by the flowchart in FIG. 4 may be implemented using machine readable instructions that comprise a program for execution by a processor such as the processor U5 shown in connection with FIG. 2-4. The program may be embodied in software stored on a tangible computer readable storage medium such as a CD-ROM, a floppy disk, a hard drive, a digital versatile disk (DVD), a Blu-ray disk, or a memory associated with the processor U5, but the entire program and/or parts thereof could alternatively be executed by a device other than the processor U5 and/or embodied in firmware or dedicated hardware. Further, although the example program is described with reference to the flowchart illustrated in FIG. 4, many other methods of implementing the example apparatus 100 described herein may alternatively be used. For example, the order of execution of the blocks may be changed, and/or some of the blocks described may be changed, eliminated, or combined.

As mentioned above, at least a portion of the example method of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. As used herein, the term computer readable medium is expressly defined to include any type of computer readable storage device and/or storage disk and to exclude propagating signals and to exclude transmission media.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    an electrical energy storage component to supply reserve power to a process control device in response to a loss of primary power supplied to the process control device from a primary power source;
    a discharge component operatively coupled to the electrical energy storage component; and
    a controller to, in response to the loss of primary power:
        actuate a switch to prevent a control signal carried by a communications line from reaching the process control device, the prevention to cause the process control device to perform an operation; and
        cause the discharge component to discharge energy from the electrical energy storage component following completion of the operation by the process control device.

2. An apparatus as defined in claim 1, wherein the controller waits a period of time after the loss of primary power before causing the discharge component to discharge energy from the electrical energy storage component, the period of time corresponding to at least an amount of time needed to complete the operation.

3. An apparatus as defined in claim 1, wherein the controller waits for a signal confirming the process control device completed the operation before causing the discharge component to discharge energy from the electrical energy storage component.

4. An apparatus as defined in claim 1 further comprising a heat sink coupled to the discharge component.

5. An apparatus as defined in claim 1, wherein the discharge component is configured such that a rate at which energy is dissipated by the discharge component does not exceed a predefined rate during the discharge of energy from the electrical energy storage component.

6. An apparatus as defined in claim 1 further comprising a status indicator to indicate a status of the electrical energy storage component.

7. An apparatus as defined in claim 1, wherein the electrical energy storage component comprises a capacitor.

8. An apparatus as defined in claim 1 further comprising an explosion proof container surrounding the apparatus.

9. An apparatus as defined in claim 1, further comprising a power router to route primary power received from the primary power source to a charger and to the process control device, the charger to charge the electrical energy storage component, wherein the controller, in response to the loss of primary power, is further to:
    cause the power router to enable a first connection between the electrical energy storage component and the process control device, the reserve power to be supplied from the electrical energy storage component to the process control device via the first connection; and
    cause the power router to disable a second connection between the primary power source and the charger.

10. An apparatus as defined in claim 1, wherein the process control device includes an actuator and a valve, and the operation of the process control device includes moving the valve via the actuator to at least one of a shutdown position or a failsafe position.

11. A method comprising:
    detecting a loss of primary power supplied from a primary power source to a process control device; and
    in response to detecting the loss of primary power:
        providing, by executing an instruction with a controller, the process control device with reserve power from an electrical energy storage component;
        actuating, by executing an instruction with the controller, a switch to prevent a control signal carried by a communications line from reaching the process control device, the preventing to cause the process control device to perform an operation; and
        discharging, by executing an instruction with the controller, remaining energy from the electrical energy storage component following completion of the operation by the process control device.

12. A method as defined in claim 11, wherein the detecting of the loss of primary power comprises comparing a voltage provided to the process control device to a threshold value.

13. A method as defined in claim 11, wherein the discharging of the remaining energy begins after an amount of time elapses since beginning to provide the process control device with the reserve power from the electrical energy storage device component.

14. A method as defined in claim 11, wherein the discharging of the remaining energy from the electrical storage component comprises using a pulse-width modulated signal.

15. A method as defined in claim 11, further comprising charging the electrical energy storage component before detecting the loss of primary power.

16. A method as defined in claim 15, wherein the charging of the electrical energy storage component comprises comparing voltage provided to the process control device to a threshold and, based on the comparison, charging the electrical energy storage component.

17. A method comprising:
    detecting a loss of primary power supplied from a primary power source to a process control device, the process control device including an actuator and a valve; and
    in response to detecting the loss of primary power:
        supplying reserve power to the process control device via an electrical energy storage device;
        actuating a switch to prevent a control signal carried by a communication line from reaching the process control device, the preventing to cause the actuator to perform an operation on the valve; and
        discharging remaining energy from the electrical energy storage device after the actuator of the process control device completes the operation.

18. A method as defined in claim 17, wherein the operation includes moving the valve via the actuator to a predetermined control position using reserve energy from the electrical energy storage component, the predetermined control position being at least one of a shutdown position or a failsafe position.

19. A method as defined in claim 17, wherein the discharging of the remaining energy from the electrical energy storage device comprises discharging the remaining energy to below a predetermined value.

20. A method as defined in claim 19, wherein the discharging of the remaining energy is performed within a predetermined amount of time.

* * * * *

UNITED STATES PATENT AND TRADEMARK OFFICE
CERTIFICATE OF CORRECTION

PATENT NO. : 10,008,879 B2
APPLICATION NO. : 14/961443
DATED : June 26, 2018
INVENTOR(S) : Pesek et al.

Page 1 of 1

It is certified that error appears in the above-identified patent and that said Letters Patent is hereby corrected as shown below:

In the Claims

Column 11, Line 10 (Claim 13): Replace "storage device component." with --storage component.--

Signed and Sealed this
Thirteenth Day of November, 2018

Andrei Iancu
*Director of the United States Patent and Trademark Office*